United States Patent
Grüll et al.

(10) Patent No.: US 11,155,644 B2
(45) Date of Patent: Oct. 26, 2021

(54) THERMALLY INHIBITED STARCH AND STARCHY FLOURS

(71) Applicant: AGRANA STÄRKE GMBH, Vienna (AT)

(72) Inventors: Dietmar Grüll, Langenschönbichl (AT); Marnik Michel Wastyn, Schwechat (AT); Karin Brunner, Tulln (AT)

(73) Assignee: AGRANA Stärke GmbH, Vienna (AT)

(*) Notice: Subject to any disclaimer, the term of this patent is extended or adjusted under 35 U.S.C. 154(b) by 209 days.

(21) Appl. No.: 16/371,322

(22) Filed: Apr. 1, 2019

(65) Prior Publication Data

US 2020/0062864 A1      Feb. 27, 2020

Related U.S. Application Data

(63) Continuation of application No. 14/410,507, filed as application No. PCT/EP2012/062715 on Jun. 29, 2012, now abandoned.

(51) Int. Cl.
| | |
|---|---|
| C08B 30/12 | (2006.01) |
| C08B 30/16 | (2006.01) |
| C08B 30/06 | (2006.01) |
| C08B 30/14 | (2006.01) |
| C08H 99/00 | (2010.01) |
| C08B 31/18 | (2006.01) |
| A23L 29/212 | (2016.01) |
| C08B 30/20 | (2006.01) |

(52) U.S. Cl.
CPC ............ *C08B 30/12* (2013.01); *A23L 29/212* (2016.08); *C08B 30/06* (2013.01); *C08B 30/14* (2013.01); *C08B 30/16* (2013.01); *C08B 30/20* (2013.01); *C08B 31/18* (2013.01); *C08H 99/00* (2013.01)

(58) Field of Classification Search
CPC ...................................... C08B 30/12
USPC ........................................... 127/32
See application file for complete search history.

(56) References Cited

U.S. PATENT DOCUMENTS

| | | | |
|---|---|---|---|
| 2,818,357 A | 12/1957 | Ziegler et al. | |
| 3,067,067 A | 12/1962 | Etheridge et al. | |
| 5,846,786 A | 12/1998 | Senkeleski et al. | |
| 5,932,017 A | 8/1999 | Chiu et al. | |
| 2009/0281304 A1 | 11/2009 | English et al. | |
| 2010/0261892 A1* | 10/2010 | Weisser ................. C08B 37/00 536/102 |

FOREIGN PATENT DOCUMENTS

| | | |
|---|---|---|
| BR | PI9506290 | 8/1997 |
| BR | PI9606921 | 10/2000 |
| BR | PI0903857 | 7/2011 |
| CN | 101628943 | 1/2010 |
| JP | H 10-503803 | 4/1998 |
| JP | H 10-505139 | 5/1998 |
| JP | H 11-506798 | 6/1999 |
| JP | 2003-501494 | 1/2003 |
| JP | 2009-270108 | 11/2009 |
| JP | 2010-248513 | 11/2010 |
| WO | WO 1996/004316 | 2/1996 |

OTHER PUBLICATIONS

Office Action issued in corresponding Brazilian Patent Application No. 11201432619-3, dated Feb. 8, 2019.
Revtech company bulletin p. 1/2, 2012 downloaded on Dec. 2, 2016.

\* cited by examiner

*Primary Examiner* — Douglas B Call
(74) *Attorney, Agent, or Firm* — Norton Rose Fulbright US LLP

(57) ABSTRACT

The present invention relates to thermally inhibited starch and starchy flours produced by heat treatment of native starch that is pre-dried where necessary to a dry matter content of more than or equal to 95% by weight, preferably 98% by weight, particularly preferably 99% by weight, wherein said starch, pre-dried where necessary, is treated in the presence of at least 0.1% by volume of oxygen at a product temperature in excess of 100° C. in a vibrating spiral conveyor.

12 Claims, No Drawings

THERMALLY INHIBITED STARCH AND STARCHY FLOURS

CROSS-REFERENCE TO RELATED APPLICATIONS

This application is a continuation of U.S. application Ser. No. 14/410,507 filed Dec. 22, 2014, which is a national phase application under 35 U.S.C. § 371 of International Application No. PCT/EP2012/062715 filed Jun. 29, 2012. The entire contents of each of the above-referenced disclosures is specifically incorporated by reference herein without disclaimer.

BACKGROUND OF THE INVENTION

1. Field of the Invention

The present invention relates to thermally inhibited starches and starchy flours produced by heat treatment of native starch that has been pre-dried where necessary to a dry matter content greater than or equal to 95% by weight, preferably 98% by weight, more preferably 99% by weight.

Native starch grains are insoluble in cold water. However, if native grains are dispersed in water and heated, they undergo hydration and swell. With continued heating, under conditions of shear or an extreme pH, the swollen grains disintegrate and the starch molecules are dispersed in the water, i.e. solubilized. Pre-gelatinized starches (i.e. starches that dissolve or swell in cold water) are typically produced by thermal, chemical or mechanical gelatinization. The present invention applies equally to native and pre-gelatinized starches and starchy flours.

2. Description of Related Art

The prior art teaches that starches may be heated for various purposes, e.g. for drying, vaporizing off-flavors, imparting a smoky taste and for sterilization or dextrination purposes.

U.S. Pat. No. 3,977,897 B describes a non-chemically inhibited starch that is produced by controlled heating, at a specific pH, of an aqueous solution of an amylose-containing starch in intact granular form and an inorganic salt, thereby leading to an increase in the starch's gelatinization temperature.

U.S. Pat. No. 4,303,451 B discloses the heating of waxy corn starch at a temperature in the range from 120 to 200° C., at the starch's naturally occurring pH, in order to eliminate woody aromas and modify the texture during pre-gelatinization.

JP 61-254602 discloses the heating of waxy corn starch and waxy corn starch derivatives at a temperature of 100 to 200° C. in order to provide a starch with emulsifying properties as a substitute for gum arabic. In this process, the starch is heated in the presence of moisture, preferably under acidic conditions at a pH of 4.0 to 5.0, in order to hydrolyse the starch and obtain the emulsifying properties.

U.S. Pat. No. 4,303,452 B discloses a smoke treatment of waxy corn starch in order to improve the gel strength and generate a smoky taste. Prior to smoking, the starch's pH is raised to a value ranging from 9 to 11 so as to counteract the smoke's acidic reaction and obtain a starch end product with a pH of 4 to 7. The preferred water content of the starch during the smoking process is 10 to 20%.

Although these documents disclose the practice of heating starches for various purposes, they do not disclose the use of heat for the production of an inhibited starch or the production, without the use of chemical reagents, of an inhibited starch.

If native starch grains are dispersed in water and heated, they undergo hydration as from approx. 60° C. and swell, reaching their maximum viscosity in the range from 65 to 95° C. This rise in viscosity, which results from the physical force of friction between the strongly swollen grains, is a desirable property in many food and industrial applications. On the other hand, however, swollen, hydrated starch grains are rather fragile. If the starch slurry is held at temperatures of 92 to 95° C., the starch grains begin to fragment and the viscosity collapses. Shear forces or extreme pH conditions also tend to promote breaking open and fragmentation of the grains, causing the starch polymers to dissociate and solubilize and the originally high viscosity to collapse rapidly.

It was already known that the swelling of starch grains and the collapse in viscosity can be inhibited by treating the starch with chemical reagents that form intermolecular bridges or cross-links between the starch molecules. The cross-links reinforce the associative hydrogen bonds holding the starch grains together, limit the degree to which the grains swell and accordingly inhibit their disintegration and fragmentation. On account of this inhibition, cross-linked starches are also referred to as inhibited starches. As chemically cross-linked starches are used in numerous applications requiring a starch paste of stable viscosity, the ability to inhibit native or modified starches without using chemicals but in such a way that the starches have the same properties as chemically cross-linked starches would be advantageous with regard to reducing costs, the time taken and the use of chemicals. Products of this kind would offer advantages over chemically inhibited starches and flours, especially from economical and ecological perspectives, and would be more in line with the market shift toward natural products such as Clean Label Products (declaration-free products).

WO 96/04315 A1 and WO 96/04316 A1 disclose thermally inhibited, pre-gelatinized or non-pregelatinized granular starches or thermally inhibited, non-pregelatinized granular flour produced by (a) dehydrating a granular starch or a granular flour to a moisture level of less than 1% by weight in order to render the starch substantially anhydrous; and (b) heat-treating the substantially anhydrous starch or the substantially anhydrous flour at a temperature of 100° C. or thereabove for a length of time sufficient to inhibit the starch or flour, the dehydration steps and heat treatment being carried out in a fluidized-bed reactor or dryer.

However, aside from some advantages, fluidized-bed reactors and fluidized-bed dryers are also known to have considerable drawbacks, for example residence time distribution of fluid by dispersion, residence time distribution of solids by back-mixing, abrasion of the vessel and attrition of the solid particles and apparatus walls, difficult scaling-up and modelling, costly explosion protection and very high energy consumption. It is often necessary, moreover, to install gas-solid separators (e.g. cyclones) in the upper part of the reactor, and the maximum flow rate is frequently limited due to the risk of particle discharge. The inhomogeneities that frequently occur in fluidized beds can complicate operation insofar as highly non-uniform residence time distributions of the reaction mixture must be anticipated. Particularly in the bubbling bed, the upward speed of the largely solid-free bubbles is highly non-uniform.

The article by Dipl.-Ing. Fritz Stoff in Chemie Ingenieur Technik, Vol. 35, Issue 4, 1963, pages 283-286 describes what is generally termed a spiral vibratory conveyor or spiral dryer.

A spiral vibratory conveyor or spiral dryer usually consists of a closed tubular system made of stainless steel. The tube is fixed to a frame that is set into vibratory motion by a motor. The speed at which the particles are transported through the tube depends on the angle of the motor and the vibratory speed, enabling the desired flow rate for the product to be set via these parameters. The atmosphere inside the tube can be controlled as specified; for example, temperatures of up to 650° C. can be generated by electrical heating of the tube wall. Product is introduced into the spiral tube via a gravimetrically controlled feed metering unit or, alternatively, by manual means, and then, depending on the product density and the set flow rate, has a defined residence time in the spiral vibratory conveyor or spiral dryer. If a lengthy treatment is required, the material can be recirculated. The absence of dead centers makes the system easy to clean. The particle residence time is indirectly proportional to the speed of the motor, that is, the faster the motor runs, the stronger is the vibration and the shorter the residence time of the product in the tube.

U.S. Pat. No. 2,818,357 B discloses a method of producing transformation or degradation products of high-molecular hydrocarbons by heating, as well as a device for carrying out a method of such kind. In principle, as is evident from FIG. 1 of the cited patent, this device is a spiral vibratory conveyor. According to column 3, lines 51-62, chemical reactions between solid substances can be carried out in the disclosed device according to the disclosed process. Thus, for instance, ethers of cellulose or starch can be obtained by heating a mixture of cellulose or starch with alkali and chloroacetic acid according to the process described. However, according to what is disclosed in U.S. Pat. No. 2,818, 357 B, the reaction must be carried out in the absence of air. Complete exclusion of air is of great importance because undesired degradation of cellulose or starch is thereby prevented.

SUMMARY OF THE INVENTION

The object of the present invention is to overcome the drawbacks of the processes described in the prior art and to provide thermally inhibited starches and starchy flours produced according to an alternative method and/or in an alternative device.

This object is established according to the invention in that thermally inhibited starches and/or starchy flours are produced by heat treatment of native starch and/or starchy flours that has/have been pre-dried where necessary to a dry matter content greater than or equal to 95% by weight, preferably 98% by weight, more preferably 99% by weight, wherein said native starch and/or starchy flours, pre-dried where necessary, is/are heat-treated in a spiral vibratory conveyor in the presence of at least 0.1% by volume oxygen at a starch and/or starchy flour temperature, referred to hereinafter as the product temperature, in excess of 100° C.

Contrary to what is disclosed in U.S. Pat. No. 2,818,357 B, it has surprisingly been found that treating native starch and/or starchy flours, pre-dried if necessary, under the conditions indicated above does not lead to thermal degradation of the products but that the presence of air or atmospheric oxygen results in thermally inhibited products. The thermally inhibited starches and flours may come from an arbitrary source, for instance bananas, corn, peas, potatoes, sweet potatoes, barley, wheat, rice, sago, amaranth, tapioca and sorghum, and may be starches with a high or low amylose content, and the like. Unless otherwise specified, references to starch in this description are to be understood as including their corresponding flours. The term starch is intended to also include starch that contains protein, either endogenous protein or added protein of animal or plant origin, e.g. zein, albumin and soybean protein. The expression "native starch", as used here, refers to naturally occurring starch. The starches may be native starches or, alternatively, starches modified by enzymes, heat or acid conversion, oxidation, phosphorylation, etherification (in particular hydroxyalkylation), esterification and chemical cross-linking. The starting products are pre-dried where necessary because if starches are subjected to heat in the presence of water, they may undergo acid hydrolysis or acid degradation. Hydrolysis or degradation will impair or prevent inhibition; conditions for dehydrating the starch must therefore be selected such as to favor inhibition rather than hydrolysis or degradation. Although arbitrary conditions that fulfil these criteria may be used, suitable conditions consist in dehydrating at low temperatures or increasing the pH of the starch prior to dehydration. The preferred conditions consist in a combination of low temperature and a neutral-to-basic pH. Starch dehydration temperatures are preferably kept at 125° C. or lower, and more preferably at temperatures or a temperature range between 100° C. and 120° C. It is possible to use a dehydration temperature below 100° C. but a temperature of at least 100° C. will eliminate moisture more efficiently. The preferred pH is at least 7, with pH ranges of 7.5 to 10.5, preferably 8 to 9.5 and, best of all, a pH above 8 being typical. A pH in excess of 12 is very apt to cause gelatinization; a pH of less than 12 is therefore more effective. To adjust the pH, the starch is slurried in water or another aqueous medium, typically in a ratio of 1.5 to 2.0 parts by weight of water to 1.0 part by weight of starch, and the pH adjusted by addition of a suitable base. Buffers such as sodium phosphate may be used where necessary in order to keep the pH stable. The starch slurry is then either dehydrated and dried, or dried directly, to the starch's equilibrium moisture content, preferably, however, to a moisture content of 2 to 6%. These drying procedures are to be distinguished from the steps in the thermal inhibition process, in which the starch is dewatered until it is anhydrous. Alternatively, a solution of a base may be sprayed onto the powdered starch until the starch reaches the desired pH, an alkaline gas such as $NH_3$ may be diffused into the starch or use may be made of dry mixtures of starch/flour and alkali.

According to a preferred embodiment of the present invention, heat treatment of the starch is performed in the spiral vibratory conveyor in the presence of at least 0.5% by volume oxygen, preferably in the presence of at least 5% by volume oxygen, more preferably in the presence of at least 10% by volume oxygen or, best of all, in the presence of atmospheric oxygen. Comparative experiments performed within the context of the present invention show that, although the presence of oxygen cannot be ruled out for technical reasons, no undesired degradation of starch products takes place under the process conditions according to the invention. Contrary to what is disclosed in the prior art, heat treatment can even be conducted in the presence of atmospheric oxygen, thereby making the method of producing thermally inhibited starch and/or starchy flours according to the invention fast, easy and cheap to carry out.

Preferably, the starch according to the invention is characterised in that it is heat treated at a product temperature of between 150 and 200° C., preferably of between 155 and 175° C. The heat treatment ranges are temperatures or a temperature range in excess of 150° C. For practical purposes, the maximum heat-treatment temperature is usually in the vicinity of 200° C., at which temperature strongly inhibited starches can be obtained. Heat treatment is typically carried out at 155 to 175° C., with time and temperature profiles depending on the desired degree of inhibition.

According to a preferred embodiment of the present invention, the starch is in granular form, preferably in the form of native starch, that is, in the form of starch as it occurs in nature.

The starch according to the invention advantageously has an amylose content of less than 5% by weight, preferably less than 2% by weight. Amylopectin is the major constituent (usually 70 to 80%) of natural vegetable starch, e.g. corn or potato starch, and the polysaccharide amylose the second major constituent, usually making up 20 to 30%. Starches rich in amylopectin, that is, starches with an amylopectin content of at least 95% by weight, are generally referred to as waxy starches or amylopectin-rich starches.

It is particularly beneficial if the starch according to the invention, having an amylose content of less than 5% by weight, preferably less than 2% by weight, is a corn starch (waxy corn starch being the term generally used for starches of this kind).

DETAILED DESCRIPTION

The present invention is now explained in more detail by reference to the following examples, which, however, are non-limiting.

Viscosity Characterization:

To characterize thermally inhibited starches and flours, the viscosity of starch and starchy flours is measured as a function of time and temperature and is compared with the starting, or reference, material. The viscosity is measured in a Brabender Viscograph-E (manufactured by Brabender Technologie KG) and is expressed in Brabender units. It is the resistance of the solution, measured as torque. The starch/water suspension is heated and cooled, at a constant rate of temperature increase and decrease, respectively, in a Brabender bowl rotating at a constant rotational speed. The temperature and the viscosity, in Brabender units, are recorded simultaneously. A graph is obtained by plotting temperature and Brabender units against time. Thermally non-inhibited starches usually gelatinize in a range between 60-70° C., reaching their maximum in the range from 65-95° C. If the temperature is held there for a certain period of time, the viscosity decreases (by what is known as the breakdown) from its peak value and then, on cooling, increases again to its end value.

As is known from the prior art, inhibited starches differ from their starting material in showing a reduced breakdown. That means that, as the level of inhibition increases, the breakdown in viscosity becomes less and less until finally a plateau is formed. At the same time, there is also a reduction in the viscosity maximum.

Brabender Method:

For a neutral Brabender, all samples are suspended in a sufficient amount of demineralized water to give a 6.25% anhydrous solids starch slurry. The suspension is introduced into the sample dish of a Brabender Viscograph-E fitted with a 700 cmg measuring bowl. For the measurement, the sample is heated from 30° C. to 90° C. and held at this temperature for 30 minutes. Thereafter, it is cooled down again to 30° C. The peak maximum, the viscosity breakdown and the end viscosity are expressed in Brabender units.

The following material and equipment is used in the examples:

Native waxy corn starch (Agrana, AT)
Chemically modified starch; Ajenajel 20.321 (Agrana, AT)
Sodium bicarbonate, 106323 (Merck, AT)
Demineralized water
Thermally inhibited starch; Novation® 2300 (National Starch, US)
Thermally inhibited starch; Novation® 2600 (National Starch, US)
Spiral vibratory conveyor or spiral dryer (Revtech, FR)
Kern analytical balance PLJ 4000-2M
Sartorius moisture analyser MA40
WTW pH meter pH330
Brabender Viscograph-E with control unit and cooling (Brabender Technologie, DE)
Haldenwanger Buchner funnel 127C-4
Whatmann® filter paper 589/1
Knf Laboport vacuum pump N820.3AT.18
Retsch dryer TG100
IKA stirrer RW 47D
Retsch mill ZM 200, 1 mm insert
Diverse laboratory accessories The spiral vibratory conveyor used is of pilot-plant scale and is dimensioned as follows:

Ø (tube interior) 0.10 m, L (tube) 35 m and V (tube) 0.275 m$^3$. The process parameters are set as follows: vibrational speed 100%, motor angle 45° and drive motor 100%.

To ensure that drying is as fast and complete as possible, the two tube openings are opened with each spiral revolution. This enables the water to vaporize and prevents it from condensing on the tube wall. Plus, a constant $O_2$ level is also guaranteed.

EXAMPLE 1

Alkalization of Starch

45% (w/w) native waxy corn starch was slurried with 55% (w/w) demineralized water and adjusted to a pH value of 9.5 with a 20% (w/w) solution of sodium bicarbonate. The slurry was vacuum-filtered on the Buchner funnel fitted with filter paper (Whatmann® 589/1) and the starch then dried at 60° C. to its equilibrium moisture content with the Retsch dryer.

TABLE 1

Comparison of Brabender data obtained for the raw material (native WCS) and for the feedstock from Example 1 (1, hereinafter referred to as non-modified starch), where GT stands for the gelatinization temperature, PM the peak maximum, BD the breakdown and EV the end viscosity

| Name | GT [° C.] | PM [BE] | BD [BE] | EV [BE] |
|---|---|---|---|---|
| 1 | 67.3 | 1066 | 777 | 546 |
| Native WCS | 68.0 | 1059 | 760 | 547 |

EXAMPLE 2

Drying: (130° C.)

The starch from Example 1 was conveyed through the spiral at a product flow rate of 50 kg/h and a product temperature of 130° C. Metering was performed gravimetrically via the automatic metering station. After a cycle, a sample was withdrawn and analysed. As is evident from Table 2, the sample does not undergo a viscosity shift in the direction of a thermally inhibited starch but retains the viscosity profile of the non-modified starch.

TABLE 2

Comparison of Brabender data obtained for the feedstock from Example 1 (non-modified starch), for a chemically modified starch (Agenajel 20.321) and for two commercially available inhibited starches (Novation ®) with the data obtained after drying (1), where GT stands for the gelatinization temperature, PM the peak maximum, BD the breakdown and EV the end viscosity

| Name | Temp. [° C.] | GT [° C.] | PM [BE] | BD [BE] | EV [BE] |
|---|---|---|---|---|---|
| 1 | 130 | 67.4 | 1408 | 1131 | 528 |
| Non-modified control | — | 67.3 | 1066 | 777 | 546 |
| Chem. mod. control | — | 65.6 | 668 | 32 | 1020 |
| Novation ® 2300 | — | 65.2 | 506 | 1 | 771 |
| Novation ® 2600 | — | 66.4 | 682 | 41 | 1011 |

EXAMPLE 3

190° C.

The two tube ends were connected with a hose so as to enable recirculation of the product. All the openings at each turn of the spiral were open. The starch from Example 1 was added at a flow rate of 100 kg/h. After drying at 130° C. for 6 minutes, the heating temperature was raised in order to reach a product temperature of 190° C. and the product recirculated until it was seen to turn intensely brown and take on a different aroma. After each cycle (approx. 6 min), the hose was removed briefly by hand and a sample withdrawn.

As is evident from Table 3, increasing the duration of treatment at a temperature of 190° C. results in starch which has a viscosity profile tending toward that of a chemically modified control sample and which is also comparable with the commercially available thermally inhibited products. The longer the starch is treated, the higher is the degree of inhibition, resulting accordingly in a lower viscosity.

TABLE 3

Comparison of Brabender data obtained for the non-modified control, for a chemically modified starch and for two commercially available inhibited starches (Novation ®) with the data obtained after treatment at 190° C. for different lengths of time (1-5), where GT stands for the gelatinization temperature, PM the peak maximum, BD the breakdown and EV the end viscosity

| Name | Temp. [° C.] | Time [min] | GT [° C.] | PM [BE] | BD [BE] | EV [BE] |
|---|---|---|---|---|---|---|
| 1 | 190 | 12 | 66.8 | 1117 | 741 | 631 |
| 2 | 190 | 18 | 66.5 | 1039 | 480 | 834 |
| 3 | 190 | 24 | 65.3 | 669 | 19 | 1016 |
| 4 | 190 | 30 | 63.3 | 419 | 0 | 634 |
| 5 | 190 | 36 | 62.0 | 207 | 0 | 371 |
| Non-modified control | — | — | 67.3 | 1066 | 777 | 546 |
| Modified control | — | — | 65.6 | 668 | 32 | 1020 |
| Novation ® 2300 | — | — | 65.2 | 506 | 1 | 771 |
| Novation ® 2600 | — | — | 66.4 | 682 | 41 | 1011 |

EXAMPLE 4

170° C.

The samples were treated in the same way as in Example 2 except that heat treatment was carried out at a product temperature of 170° C. It is evident from Table 4 that thermal inhibition intensity increases with increasing treatment duration, and that thermostable samples are obtained which have a strongly reduced breakdown and have the properties of chemically modified starches.

TABLE 4

Comparison of Brabender data obtained for the non-modified starch, for a chemically modified starch and for two commercially available inhibited starches (Novation ®) with the data obtained after treatment at 170° C. for different lengths of time (1-6), where GT stands for the gelatinization temperature, PM the peak maximum, BD the breakdown and EV the end viscosity

| Name | Temp. [° C.] | Time [min] | GT [° C.] | PM [BE] | BD [BE] | EV [BE] |
|---|---|---|---|---|---|---|
| 1 | 170 | 18 | 67.0 | 1125 | 717 | 667 |
| 2 | 170 | 30 | 66.4 | 933 | 193 | 1224 |
| 3 | 170 | 36 | 66.2 | 842 | 101 | 1166 |
| 4 | 170 | 42 | 66.0 | 722 | 14 | 1103 |
| 5 | 170 | 48 | 65.9 | 653 | 3 | 1035 |
| 6 | 170 | 54 | 65.6 | 564 | 0 | 853 |
| Non-modified control | — | — | 67.3 | 1066 | 777 | 546 |
| Modified control | — | — | 65.6 | 668 | 32 | 1020 |
| Novation ® 2300 | — | — | 65.2 | 506 | 1 | 771 |
| Novation ® 2600 | — | — | 66.4 | 682 | 41 | 1011 |

EXAMPLE 5

150° C.

The samples were treated in the same way as in Example 2 except that heat treatment was carried out at a product temperature of 150° C. In this case, there was only a low level of thermal inhibition and the starch obtained was only slightly more stable than a non-modified starch.

TABLE 5

Comparison of Brabender data obtained for the non-modified control, for a chemically modified starch and for two commercially available inhibited starches (Novation ®) with the data obtained after treatment at 150° C. for different lengths of time (1-8), where GT stands for the gelatinization temperature, PM the peak maximum, BD the breakdown and EV the end viscosity.

| Name | Temp. [° C.] | Time [min] | GT [° C.] | PM [BE] | BD [BE] | EV [BE] |
|---|---|---|---|---|---|---|
| 1 | 150 | 30 | 66.9 | 1146 | 653 | 743 |
| 2 | 150 | 36 | 66.8 | 1063 | 439 | 868 |
| 3 | 150 | 42 | 66.8 | 1208 | 561 | 923 |
| 4 | 150 | 48 | 66.7 | 968 | 227 | 1118 |
| 5 | 150 | 54 | 66.7 | 968 | 211 | 1204 |
| 6 | 150 | 60 | 66.9 | 936 | 205 | 1318 |
| 7 | 150 | 66 | 67.0 | 923 | 203 | 1320 |
| 8 | 150 | 72 | 66.6 | 915 | 166 | 1222 |
| Non-modified control | — | — | 67.3 | 1066 | 777 | 546 |
| Modified control | — | — | 65.6 | 668 | 32 | 1020 |
| Novation ® 2300 | — | — | 65.2 | 506 | 1 | 771 |
| Novation ® 2600 | — | — | 66.4 | 682 | 41 | 1011 |

It is evident that the treatment of starch in in a spiral vibratory converter is a continuous process and that, the higher the temperature is set, the reaction will proceed exponentially faster. With the spiral vibratory converter, curves can be generated that are equivalent to those of commercially available thermally inhibited starches. It is clearly apparent that, at a higher temperature, the same result can be obtained in a shorter time than is obtained, at a lower temperature, in a longer time.

EXAMPLE 6

Application-Related Comparison of Thermally Inhibited Starches

Three of the samples produced in the spiral vibratory converter (190° C./24 min, 170° C./36 min and 170° C./54 min) were processed in a 40° Brix cherry fruit preparation and tested for their suitability in a sensitive food system with an acidic pH.

Table 6 below shows the formulation for the 40° Brix cherry fruit preparation used for application-related testing of the starch profiles produced.

TABLE 6

Formulation for 40° Brix cherry fruit preparation

| Material | Mass |
|---|---|
| Water | 153.00 |
| Sour cherries cut in half | 400.00 |
| Sodium citrate | 1.00 |
| Sugar heat to 40° C. | 300.00 |
| Water | 100.00 |
| Starch addition of slurried starch, heat to 95° C. | 45.00 |
| Citric acid heat to 92° C., hold for 10 min | 1.00 |
| Total | 1000.00 |

In the following evaluation, the three samples are compared in terms of taste, appearance and viscosity/rheology.

TABLE 7

List of results for differently produced thermally inhibited starches in a 40° Brix cherry fruit preparation

| Starch | pH | Viscosity [mm/30 s] D = 1 | Viscosity [mm/30 s] D = 14 | Synaeresis in fruit prep. D = 14 | Texture of fruit prep. | Blending in the yogurt | Taste |
|---|---|---|---|---|---|---|---|
| 190° 24 min | 3.28 | 58 | 50 | No | Very good | Good, very satisfactory structure | Typical |
| 170° C. 36 min | 3.30 | 48 | 39 | No | Good, somewhat jellified | Good, very satisfactory structure | Typical |
| 170° C. 54 min | 3.32 | 60 | 66 | No | Good | Good, very satisfactory structure | Typical |

The Brabender viscosities of the samples according to the invention, produced in the spiral vibratory conveyor, are comparable with the quality of the Novation starches known from the prior art. In addition, they are able to substitute for chemically modified starches.

The sample treated for 54 minutes at 170° C. has a viscosity curve similar to that of Novation 2300 and has a slightly higher viscosity.

Both the sample treated for 42 minutes at 170° C. and the sample treated for 24 minutes at 190° C. show a viscosity profile that corresponds to that of Novation 2600 and thus to a commercially available thermally inhibited starch.

The invention claimed is:

1. A method of producing a thermally inhibited starch or starchy flour comprising heat-treating for 24 minutes to 72 minutes, at a pH of 7 to 12, a native starch in a spiral vibratory conveyor in the presence of at least 0.1% by volume oxygen to atmospheric oxygen concentrations at a product temperature of between 150 and 200° C., wherein the native starch has a dry matter content of 98% to 99% by weight and has been pre-dried, if necessary, to obtain the dry matter content.

2. The method of claim 1, wherein the native starch has a dry matter content equal to 99% by weight and has been pre-dried, if necessary, to obtain the dry matter content.

3. The method of claim 1, wherein heat treatment is carried out in the presence of at least 0.5% by volume oxygen to atmospheric oxygen concentrations.

4. The method of claim 1, wherein heat treatment is carried out in the presence of atmospheric oxygen.

5. The method of claim 1, wherein heat-treating is carried out at a product temperature of between 155 and 175° C.

6. The method of claim 1, wherein the thermally inhibited starch or starchy flour is further defined as having an amylose content of less than 5% by weight.

7. The method of claim 6, wherein the thermally inhibited starch or starchy flour is further defined as having an amylose content of less than 2% by weight.

8. The method of claim 6, wherein the thermally inhibited starch or starchy flour is further defined as a starch originating from waxy corn.

9. A thermally inhibited starch or starchy flour produced by the method of claim 1, wherein the starch or starchy flour has a granular form.

10. The thermally inhibited starch or starchy flour of claim 9, further defined as having an amylose content of less than 5% by weight.

11. The thermally inhibited starch or starchy flour of claim 10, further defined as having an amylose content of less than 2% by weight.

12. The thermally inhibited starch or starchy flour of claim 10, further defined as a starch originating from waxy corn.

* * * * *